(12) United States Patent
Mitadera et al.

(10) Patent No.: US 8,895,122 B2
(45) Date of Patent: Nov. 25, 2014

(54) POLYAMIDE RESIN COMPOSITION AND MOLDED PRODUCT

(75) Inventors: Jun Mitadera, Kanagawa (JP); Masashi Kurokawa, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 167 days.

(21) Appl. No.: 13/376,737

(22) PCT Filed: Jun. 9, 2010

(86) PCT No.: PCT/JP2010/059794
§ 371 (c)(1),
(2), (4) Date: Dec. 7, 2011

(87) PCT Pub. No.: WO2010/143668
PCT Pub. Date: Dec. 16, 2010

(65) Prior Publication Data
US 2012/0076964 A1 Mar. 29, 2012

(30) Foreign Application Priority Data
Jun. 9, 2009 (JP) ................ 2009-138490

(51) Int. Cl.
| | | |
|---|---|---|
| B32B 1/08 | (2006.01) |
| C08K 5/18 | (2006.01) |
| C08G 69/26 | (2006.01) |
| F16L 9/127 | (2006.01) |
| F16L 11/06 | (2006.01) |
| C08L 77/06 | (2006.01) |
| F16L 11/04 | (2006.01) |

(52) U.S. Cl.
CPC . *F16L 11/06* (2013.01); *C08K 5/18* (2013.01); *C08G 69/265* (2013.01); *F16L 9/127* (2013.01); *C08L 77/06* (2013.01); *C08G 69/26* (2013.01); *F16L 2011/047* (2013.01); *C08K 2201/008* (2013.01)
USPC ........................................ 428/36.9

(58) Field of Classification Search
CPC ...... C08G 69/26; C08G 69/265; C08L 77/06; F16L 9/00; F16L 11/00; F16L 11/06; F16L 2011/047
USPC ........................................ 428/36.9
See application file for complete search history.

(56) References Cited

U.S. PATENT DOCUMENTS

| | | | | |
|---|---|---|---|---|
| 2,718,501 A | * | 9/1955 | Harle ............................ | 508/563 |
| 4,018,746 A | * | 4/1977 | Brinkmann et al. .......... | 528/338 |
| 5,756,580 A | * | 5/1998 | Natori et al. .................. | 525/100 |
| 6,267,148 B1 | * | 7/2001 | Katayama et al. ............ | 138/137 |

FOREIGN PATENT DOCUMENTS

| | | | |
|---|---|---|---|
| JP | 59 27948 | | 2/1984 |
| JP | 2004 143447 | | 5/2004 |
| JP | 2004 181629 | | 7/2004 |
| JP | 2004181629 | * | 7/2004 |
| JP | 2004181629 A | * | 7/2004 |
| JP | 2006 028327 | | 2/2006 |
| JP | 2007 039577 | | 2/2007 |
| JP | 2008 56766 | | 3/2008 |

OTHER PUBLICATIONS

International Search Report issued Sep. 21, 2010 in PCT/JP10/059794 filed Jun. 9, 2010.
U.S. Appl. No. 13/376,737, filed Dec. 7, 2011, Mitadera et al.
U.S. Appl. No. 13/376,468, filed Dec. 6, 2011, Mitadera et al.

* cited by examiner

*Primary Examiner* — Gwendolyn Blackwell
*Assistant Examiner* — Susan R Dye
(74) *Attorney, Agent, or Firm* — Oblon, Spivak, McClelland, Maier & Neustadt, L.L.P.

(57) ABSTRACT

Disclosed is an m-xylene group-containing polyamide resin composition having excellent gas barrier properties and heat aging resistance, which contains (A) a polyamide composed of a diamine unit containing 30% by mole or more of an m-xylylenediamine unit and a dicarboxylic acid unit and (B) an aromatic secondary amine based compound and has an oxygen permeability coefficient of not more than 1 cc·mm/m²·day·atm at 23° C. and 75% RH.

22 Claims, No Drawings

POLYAMIDE RESIN COMPOSITION AND MOLDED PRODUCT

This application is a 371 of PCT/JP10/59794 filed Jun. 9, 2010. Priority to Japanese patent application 2009-138490, filed Jun. 9, 2009, is claimed.

TECHNICAL FIELD

The present invention relates to a polyamide resin composition having excellent heat aging resistance and gas barrier properties and to a molded product comprising the same.

BACKGROUND ART

In view of the fact that polyamides are excellent in characteristics such as strength, rigidity, solvent resistance, moldability, and the like, they are used as injection molding materials such as automobile or electric and electronic parts and the like, or packaging materials for foodstuffs, beverages, chemicals, electronic parts, or the like. Above all, polyamides containing an m-xylene group in a polymer principal chain are high in rigidity and also excellent in barrier properties against various gases or chemicals or the like, and hence, they are widely used as injection molding materials or packaging materials.

However, in the polyamides containing an m-xylene group in a polymer principal chain, in view of the fact that a radical is easily formed at the benzyl methylene position from the structural standpoint, they are low in heat stability or heat aging resistance as compared with polyamides such as nylon 6 and the like. For that reason, there are uses to which the polyamides containing an m-xylene group are hardly applied as a molding material, depending upon a severe use environment or condition, for example, a high-temperature environment, etc.

In recent years, in the fields of automobile parts and the like, in which gas barrier properties and heat aging resistance are required, although utilization of polyamides is studied, for the foregoing reasons, it was difficult to apply the polyamides containing an m-xylene group in a polymer principal chain.

For that reason, there are made proposals for improving the heat stability or heat aging resistance of polyamides. For example, Patent Document 1 discloses a heat-resistant polyamide composed of a polyamide containing an m-xylene group in a polymer principal chain, a copper compound, a halide, a hindered phenol and/or a hindered amine, and an organophosphorus compound. However, this method is a method suited for stretched fibers, but it was an unsatisfactory technique for enhancing the heat aging resistance of injection molded products or extrusion molded products to be used for automobile parts and the like.

Also, for example, Patent Document 2 proposes a method in which on the occasion of molding processing of a polyamide containing an m-xylene group in a polymer principal chain, at least one member selected from a lubricant, an organophosphorus based stabilizer, a hindered phenol compound, and a hindered amine compound is added in an amount of from 0.005 to 0.5 parts by mass, thereby preventing gelation of the polyamide from occurring. However, this method is a technique for preventing the gelation from occurring during the molding processing, but it was an unsatisfactory technique for enhancing the heat aging resistance after molding.

Also, for example, Patent Document 3 describes, as a molding material for precision parts, an example in which an aromatic secondary amine based compound is incorporated as a heat stabilizer into a polyamide. However, this technique is a technique suited for nylon 66, but effects against polyamides having a different polymer skeleton were not reviewed.

In the light of the above, in particular, with respect to the foregoing polyamides having excellent gas barrier properties, it is the present state that a technique for enhancing the heat aging resistance while keeping the gas barrier properties has not been found yet.

PRIOR ART DOCUMENTS
Patent Documents
  Patent Document 1: JP-A-10-130497
  Patent Document 2: JP-A-2001-164109
  Patent Document 3: JP-A-2006-28327

SUMMARY OF THE INVENTION

Problem to be Solved by the Invention

An object of the present invention is to provide a polyamide resin composition containing an m-xylylene group in a polymer principal chain, which is able to solve the foregoing problems and which is excellent in gas barrier properties and heat aging resistance, and a molded product comprising the same.

Means for Solving the Problem

The present inventors made extensive and intensive investigations. As a result, it has been found that the foregoing problem is solved by a polyamide resin composition comprising (A) a polyamide composed of a diamine unit containing 30% by mole or more of an m-xylylenediamine unit and a dicarboxylic acid unit and (B) an aromatic secondary amine based compound, the polyamide resin composition having an oxygen permeability coefficient of not more than 1 cc·mm/m$^2$·day·atm at 23° C. and 75% RH.

Effect of the Invention

The polyamide resin composition of the present invention is excellent in gas barrier properties and heat aging resistance. A molded product comprising the same can be utilized for automobile parts and the like, in which gas barrier properties and heat aging resistance are required, and its industrial value is very high.

MODES FOR CARRYING OUT THE INVENTION

<Polyamide Resin Composition>

The polyamide resin composition of the present invention comprises (A) a polyamide composed of a diamine unit containing 30% by mole or more of an m-xylylenediamine unit and a dicarboxylic acid unit and (B) an aromatic secondary amine based compound, and an oxygen permeability coefficient thereof is not more than 1 cc·mm/m$^2$·day·atm at 23° C. and 75% RH. Incidentally, in the present invention, the "diamine unit" refers to a constituent unit derived from a raw material diamine component of the polyamide, and the "dicarboxylic acid unit" refers to a constituent unit derived from a raw material dicarboxylic acid of the polyamide. It is preferable that the polyamide resin composition further comprises (C) an organic sulfur based compound.

The polyamide (A) which is used in the present invention is a polyamide containing 30% by mole or more, preferably 50% by mole or more, more preferably 70% by mole or more, still more preferably 80% by mole or more, and especially preferably 90% by mole or more of an m-xylylenediamine unit. By regulating the content of the m-xylylenediamine unit in the diamine unit to 30% by mole or more, the gas barrier properties and gas barrier properties under a high humidity of the polyamide (A) can be made favorable. As the polyamide (A), for example, there are exemplified polyamides obtained by polycondensation of a diamine component composed mainly of m-xylylenediamine and a dicarboxylic acid component of every sort, and so on. Such a polyamide may be a homopolymer or a copolymer. The subject polyamide has a high gas barrier performance and is favorable in heat resistance and molding processability. The polyamide (A) can be used singly or as a blend of a plurality of the resins.

Also, as the diamine unit, a p-xylylenediamine unit can be added to the m-xylylenediamine unit. By adding the p-xylylenediamine unit to the m-xylylenediamine unit, the melting point, glass transition temperature and heat resistance of the polyamide (A) can be enhanced. So far as the content of the p-xylylenediamine unit falls within the range not exceeding 70% by mole, by adding it in an arbitrary proportion, the heat resistance, barrier properties and molding processability can be controlled.

As diamine components other than m-xylylenediamine which can be used for the production of the polyamide (A), there can be exemplified aliphatic diamines such as tetramethylenediamine, pentamethylenediamine, 2-methylpentanediamine, hexamethylenediamine, heptamethylenedimeine, octamethylenedimeine, nonamethylenedimeine, decamethylenedimeine, dodecamethylenedimeine, 2,2,4-trimethyl-hexamethylenedimeine, 2,4,4-trimethylhexamethylenedimeine, and the like; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, bis(aminomethyl)tricyclodecane, and the like; aromatic ring-containing diamines such as bis(4-aminophenyl)ether, p-phenylenediamine, p-xylylenediamine, bis(aminomethyl)naphthalene, and the like; and so on. However, it should not be construed that the present invention is limited thereto.

The polyamide (A) which is used in the present invention is a polyamide containing, as a dicarboxylic acid unit, 50% by mole or more, preferably 70% by mole or more, more preferably 80% by mole or more, and still more preferably 90% by mole or more of an $\alpha,\omega$-linear aliphatic dicarboxylic acid unit having from 4 to 20 carbon atoms. By regulating the content of the $\alpha,\omega$-linear aliphatic dicarboxylic acid unit having from 4 to 20 carbon atoms in the dicarboxylic acid unit to 50% by mole or more, the gas barrier properties and gas barrier properties under a high humidity of the polyamide (A) can be made favorable.

As the dicarboxylic acid component which can be used for the production of the polyamide (A), there can be exemplified aliphatic dicarboxylic acids such as succinic acid, glutaric acid, pimelic acid, suberic acid, azelaic acid, adipic acid, sebacic acid, undecane diacid, dodecane diacid, and the like; aromatic dicarboxylic acids such as terephthalic acid, isophthalic acid, 2,6-naphthalenedicarboxylic acid, and the like; and so on. However, it should not be construed that the present invention is limited thereto.

Also, in the polyamide (A) which is used in the present invention, a mixture of an $\alpha,\omega$-linear aliphatic dicarboxylic acid having from 4 to 20 carbon atoms and isophthalic acid can be used as the dicarboxylic acid component. By using the foregoing mixture, the heat resistance and molding processability of the polyamide (A) can be enhanced.

A mixing ratio of the $\alpha,\omega$-linear aliphatic dicarboxylic acid having from 4 to 20 carbon atoms and isophthalic acid (($\alpha$, $\omega$-linear aliphatic dicarboxylic acid having from 4 to 20 carbon atoms)/(isophthalic acid) molar ratio) is preferably from 50/50 to 99/1, and more preferably from 70/30 to 95/5.

Furthermore, by using a mixture of adipic acid and sebacic acid as the dicarboxylic acid component, the heat resistance, gas barrier properties and crystallinity can be arbitrarily controlled. In the case where it is intended to lower the crystallinity, or in the case where the system is rendered in an amorphous state, a mixing ratio of adipic acid and sebacic acid ((sebacic acid)/(adipic acid) molar ratio) is preferably from 80/20 to 30/70, and more preferably from 70/30 to 40/60. In the case of attaching importance to the gas barrier properties, as to the foregoing mixing ratio, it is effective to reduce a mixing proportion of sebacic acid. Specifically, the mixing ratio is preferably not more than 50/50, more preferably not more than 40/60, and still more preferably not more than 30/70. In the case of attaching importance to the heat resistance, as to the foregoing mixing ratio, it is effective to reduce a mixing proportion of sebacic acid. Specifically, the mixing ratio is preferably not more than 60/40, more preferably not more than 40/60, and still more preferably not more than 30/70.

In addition to the foregoing diamine component and dicarboxylic acid component, a lactam such as $\epsilon$-caprolactam, laurolactam, and the like, or an aliphatic aminocarboxylic acid such as aminocaproic acid, aminoundecanoic acid, and the like can also be used as the copolymerization component within the range where the effects of the present invention are not impaired.

As the polyamide (A) which can be utilized in the present invention, there can be exemplified poly(m-xylylene isophthalamide) (PA-MXDI), a caprolactam/m-xylylene isophthalamide copolymer (PA-6/MXDI), and so on.

As the polyamide (A) which can be preferably utilized in the present invention, there are exemplified a polyamide obtained by polycondensation of a diamine containing mainly m-xylylenediamine and adipic acid (hereinafter referred to as "polyamide (a)"); a polyamide obtained by polycondensation of a diamine containing mainly m-xylylenediamine and sebacic acid (hereinafter referred to as "polyamide (b)"); a polyamide obtained by polycondensation of a diamine containing mainly m-xylylenediamine, adipic acid and sebacic acid; and so on. Here, it is meant by the foregoing term "mainly" that the content is 50% by mole or more of the whole of the diamine.

For example, as the polyamide (a), there can be exemplified poly(m-xylylene adipamide); and as the polyamide (b), there can be exemplified poly(m-xylylene sebacamide). Furthermore, as the polyamide (A), there can be exemplified a polyamide obtained by polycondensation of m-xylylenediamine, p-xylylenediamine and adipic acid; and a polyamide obtained by polycondensation of m-xylylenediamine, p-xylylenediamine and sebacic acid.

Also, as the polyamide (A) which can be preferably utilized in the present invention, there can be exemplified a mixture of the foregoing polyamide (a) and polyamide (b). By mixing the foregoing polyamide (a) and polyamide (b), the heat resistance and gas barrier properties can be arbitrarily controlled while keeping the crystallinity. In the case of attaching importance to the gas barrier properties, as to a mixing ratio of the polyamide (a) and the polyamide (b) ((polyamide (b))/(polyamide (a)) mass ratio), it is effective to reduce a mixing proportion of the polyamide (b). More specifically, the mixing ratio is preferably not more than 50/50, more preferably not more than 40/60, and still more preferably not more than 30/70.

As the polyamide (A) which can be preferably utilized in the present invention, more specifically, there can be exemplified polyamides obtained by polycondensation of each dicarboxylic acid component containing 50% by mole or more, preferably 70% by mole or more, more preferably 80% by mole or more, and still more preferably 90% by mole or more of an α,ω-linear aliphatic dicarboxylic acid having from 4 to 20 carbon atoms, on each diamine component containing 30% by mole or more, preferably 50% by mole or more, more preferably 70% by mole or more, still more preferably 80% by mole or more, and especially preferably 90% by mole or more of m-xylylenediamine.

As the foregoing α,ω-linear aliphatic dicarboxylic acid having from 4 to 20 carbon atoms, for example, there can be exemplified aliphatic dicarboxylic acids such as succinic acid, glutaric acid, pimelic acid, suberic acid, azelaic acid, adipic acid, sebacic acid, undecane diacid, dodecane diacid, and the like. Of these, adipic acid and sebacic acid are preferable.

As the polyamide (A) which can be preferably utilized in the present invention, specifically, there can be exemplified polyamides composed of a diamine unit containing an m-xylylenediamine unit and a p-xylylenediamine unit, and a dicarboxylic acid unit containing 50% by mole or more of an α,ω-linear aliphatic dicarboxylic acid unit having from 4 to 20 carbon atoms. As the polyamide (A), more preferably, there are exemplified polyamides composed of a diamine unit containing 30% by mole or more of an m-xylylenediamine unit and from 1 to 70% by mole of a p-xylylenediamine unit, and a dicarboxylic acid unit containing 50% by mole or more of an α,ω-linear aliphatic dicarboxylic acid unit having from 4 to 20 carbon atoms.

Also, as the polyamide (A) which can be preferably utilized in the present invention, specifically, there are exemplified polyamides composed of a dicarboxylic acid unit containing an α,ω-linear aliphatic dicarboxylic acid unit having from 4 to 20 carbon atoms and an isophthalic acid unit, and a diamine unit containing 70% by mole or more of an m-xylylenediamine unit. More specifically, there are exemplified polyamides composed of a dicarboxylic acid unit containing 50% by mole or more of an α,ω-linear aliphatic dicarboxylic acid unit having from 4 to 20 carbon atoms and from 1 to 50% by mole of an isophthalic acid unit, and a diamine unit containing 70% by mole or more of an m-xylylenediamine unit. More preferably, there can be exemplified polyamides composed of a dicarboxylic acid unit containing 70% by mole or more of an α,ω-linear aliphatic dicarboxylic acid unit having from 4 to 20 carbon atoms and from 1 to 30% by mole of an isophthalic acid unit, and a diamine unit containing 70% by mole or more of an m-xylylenediamine unit.

The polyamide (A) is not particularly limited with respect to its production method, and it can be produced by the conventionally known method and polymerization condition. A small amount of a monoamine or a monocarboxylic acid may be added as a molecular weight modifier at the time of polycondensation of the polyamide. For example, the polyamide (A) is produced by a method in which a nylon salt composed of m-xylylenediamine and adipic acid is subjected to temperature elevation in a pressurized state in the presence of water and polymerized in a molten state while removing added water and condensed water. The polyamide (A) is also produced by a method in which m-xylylenediamine is added directly to adipic acid in a molten state, and the mixture is subjected to polycondensation at atmospheric pressure. In that case, for the purpose of keeping the reaction system in a uniform molten state, m-xylylenediamine is continuously added to adipic acid, and meanwhile, the polycondensation is allowed to proceed while subjecting the reaction system to temperature elevation such that the reaction temperature is not lower than the melting points of the formed oligoamide and polyamide.

Also, the polyamide (A) may be produced by carrying out solid phase polymerization for performing a heat treatment in a solid phase state, after being produced by a melt polymerization method. The polyamide (A) is not particularly limited with respect to its production method, and it can be produced by the conventionally known method and polymerization condition.

A number average molecular weight (Mn) of the polyamide (A) is preferably from 18,000 to 70,000, and more preferably from 20,000 to 50,000 in terms of a value as reduced into PMMA (polymethyl methacrylate) by means of GPC (gel permeation chromatography) measurement. When the number average molecular weight (Mn) of the polyamide (A) falls within this range, favorable heat resistance and molding processability are obtained.

A melting point of the polyamide (A) which is used in the present invention is preferably from 150 to 300° C. If the melting point of the polyamide (A) falls within this range, when the polyamide (A) is mixed with (B) an aromatic secondary amine based compound, fusion of the resin in an extruder becomes easy, and favorable productivity and molding processability are obtained.

Incidentally, the melting point and glass transition temperature can be measured by a DSC (differential scanning calorimetry) method. For example, the measurement can be carried out by taking about 5 mg of a sample and heating it at from room temperature to 300° C. under a condition at a temperature elevation rate of 10° C./min by using DSC-60, manufactured by Shimadzu Corporation. As an atmosphere gas, nitrogen may be allowed to flow at 30 mL/min. As the glass transition temperature, a so-called midpoint temperature (Tgm) was employed. Incidentally, as widely known, the Tgm is a midpoint temperature of intersecting points of tangent lines of base lines of a glass state and a supercooled state (rubber state) and a tangent line of a slope of transition in a DSC curve.

To the polyamide (A), a phosphorus compound can be added for the purpose of enhancing the processing stability at the time of melt molding, or for the purpose of preventing coloration of the polyamide (A). As the phosphorus compound, phosphorus compounds containing an alkali metal or an alkaline earth metal are suitably used, and examples thereof include phosphoric acid salts, hypophosphorous acid salts and phosphorous acid salts of an alkali metal or an alkaline earth metal such as sodium, magnesium, calcium, and the like. In particular, those using a hypophosphorous acid salt of an alkali metal or an alkaline earth metal are preferably used because they are especially excellent in an effect for preventing coloration of the polyamide. A concentration of the phosphorus compound in the polyamide is preferably from 1 to 1,000 ppm, more preferably from 1 to 500 ppm, still more preferably from 1 to 350 ppm, and especially preferably from 1 to 200 ppm in terms of phosphorus atom.

The polyamide resin composition of the present invention contains (B) an aromatic secondary amine compound as a constituent component other than the polyamide (A). In the aromatic secondary amine compound (B), compounds having a diphenylamine skeleton, compounds having a phenylnaphthylamine skeleton, and compounds having a dinaphthylamine skeleton are preferable; and compounds having a diphenylamine skeleton and compounds having a phenylnaphthylamine skeleton are more preferable. Specifically, there can be exemplified compounds having a diphenylamine skeleton such as p,p'-dialkyldiphenylamine (carbon number of alkyl group: 8 to 14), octylated diphenylamine, 4,4'-bis(α,α-dimethylbenzyl)diphenylamine, p-(p-toluenesulfonylamido)diphenylamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, and the like; compounds having a phenylnaphthylamine skeleton such as N-phenyl-1-naphthylamine, N,N'-di-2-naphthyl-p-phenylenediamine, and the like; compounds having a dinaphthylamine skeleton such as 2,2'-dinaphthylamine, 1,2'-dinaphthylamine, 1,1'-dinaphthylamine, and the like; and mixtures thereof. However, it should not be construed that the present invention is limited thereto. Of these, 4,4'-bis(α,α-dimethylbenzyl)diphenylamine, N,N'-di-2-naphthyl-p-phenylenediamine, and N,N'-diphenyl-p-phenylenediamine are more preferable; and N,N'-di-2-naphthyl-p-phenylenediamine and 4,4'-bis(α,α-dimethylbenzyl)diphenylamine are especially preferable.

A blending amount of such an aromatic secondary amine compound (B) is preferably from 0.01 to 5 parts by mass, more preferably from 0.1 to 2.0 parts by mass, and especially preferably from 0.2 to 1.0 part by mass based on 100 parts by mass of the polyamide (A). When the blending amount falls within the range of from 0.01 to 5 parts by mass, an effect for enhancing the heat aging resistance is brought about, and the surface of a molded product is favorable, and hence, such is preferable.

It is preferable that the polyamide resin composition of the present invention further contains (C) an organic sulfur based compound. Among organic sulfur based compounds, mercaptobenzoimidazole based compounds, dithiocarbamic acid based compounds, thiourea based compounds, and organic thio acid based compounds are preferable; and mercaptobenzoimidazole based compounds and organic thio acid based compounds are more preferable. Specifically, there can be exemplified mercaptobenzoimidazole based compounds such as 2-mercaptobenzoimidazole, 2-mercaptomethylbenzimidazole, metal salts of 2-mercaptobenzimidazole, and the like; organic thio acid based compounds such as dilauryl-3,3'-thiodipropionate, dimyristyl-3,3'-thiodipropionate, distearyl-3,3'-thiodipropionate, pentaerythritol tetrakis(3-laurylthiopropionate), and the like; dithiocarbamic acid based compounds such as metal salts of diethyldithiocarbamic acid, metal salts of dibutyldithiocarbamic acid, and the like; thiourea based compounds such as 1,3-bis(dimethylaminopropyl)-2-thiourea, tributylthiourea, and the like; and mixtures thereof. However, it should not be construed that the present invention is limited thereto. Of these, 2-mercaptobenzoimidazole, 2-mercaptomethylbenzimidazole, dimyristyl-3,3'-thiodipropionate, distearyl-3,3'-thiodipropionate, and pentaerythritol tetrakis(3-laurylthiopropionate) are preferable; pentaerythritol tetrakis(3-laurylthiopropionate), dimyristyl-3,3'-thiodipropionate, and 2-mercaptobenzoimidazole are more preferable; and pentaerythritol tetrakis(3-laurylthiopropionate) is especially preferable.

A blending amount of such an organic sulfur based compound (C) is preferably from 0.01 to 5 parts by mass, more preferably from 0.1 to 2.0 parts by mass, and especially preferably from 0.2 to 1.0 part by mass based on 100 parts by mass of the polyamide (A). When the blending amount falls within the range of from 0.01 to 5 parts by mass, an effect for enhancing the heat aging resistance is brought about, and the surface of a molded product is favorable, and hence, such is preferable.

As the foregoing aromatic secondary amine based compound (B) and organic sulfur based compound (C), one kind or two or more kinds of the aromatic secondary amine based compound (B) may be added, and one kind or two or more kinds of the organic sulfur based compound (C) may be added. Furthermore, it is preferable that the aromatic secondary amine based compound (B) and the organic sulfur based compound (C) are used in combination. When the aromatic secondary amine based compound (B) and the organic sulfur based compound (C) are used in combination, the heat aging resistance of the polyamide resin compound becomes favorable as compared with that in the case of single use of each of these compounds.

More specifically, as a suitable combination of the aromatic secondary amine based compound (B) and the organic sulfur based compound (C), there is exemplified a combination of, as the aromatic secondary amine based compound (B), at least one member selected from 4,4'-bis(α,α-dimethylbenzyl)diphenylamine and N,N'-di-2-naphthyl-p-phenylenediamine; and, as the organic sulfur based compound (C), at least one member selected from dimyristyl-3,3'-thiodipropionate, 2-mercaptobenzimidazole, and pentaerythritol tetrakis(3-laurylthiopropionate). Furthermore, a combination of N,N'-di-2-naphthyl-p-phenylenediamine as the aromatic secondary amine based compound (B) and pentaerythritol tetrakis(3-laurylthiopropionate) as the organic sulfur based compound (C) is more preferable.

Also, a content ratio of the foregoing aromatic secondary amine based compound (B) and organic sulfur based compound (C) ((B)/(C) mass ratio) in the polyamide resin composition is preferably from 0.05 to 15, more preferably from 0.1 to 5.0, and still more preferably from 0.2 to 2.0.

By making the content ratio of the secondary amine based compound (B) and the organic sulfur based compound (C) in the polyamide resin composition fall within the range of from 0.05 to 15, the heat aging resistance can be efficiently enhanced while keeping the barrier properties.

In the polyamide resin composition of the present invention, one kind or plural kinds of resins such as a polyamide other than the polyamide (A), a polyester, a polyolefin, a polyphenylene sulfide, a polycarbonate, and the like can be blended within the range where the purpose is not impaired.

Above all, a polyamide other than the polyamide (A) can be preferably blended. More preferably, an aliphatic polyamide resin can be blended. The aliphatic polyamide resin is preferably used because it is able to improve mechanical physical properties of a molded product. As the aliphatic polyamide resin, nylon 6, nylon 66, nylon 11, nylon 12, nylon 46, nylon 610, nylon 612, nylon 666, and so on can be used singly or plurally.

The polyamide resin composition of the present invention may contain an inorganic filler. By using the inorganic filler, the rigidity and dimensional stability of the molded product can be enhanced. The inorganic filler includes a variety of fillers having a fibrous, powdered, granular, plate-like, cloth-like or mat-like shape. Examples thereof include glass fiber, carbon fiber, graphite fiber, carbon black, calcium carbonate, talc, catalpo, wollastonite, silica, alumina, diatomaceous earth, clay, kaolin, mica, granular glass, glass flake, hollow glass, gypsum, red iron oxide, metal fiber, titanium dioxide, potassium titanate whisker, aluminum borate whisker, magnesium oxide, calcium silicate, sodium aluminate, calcium aluminate, aluminum, aluminum oxide, aluminum hydroxide, copper, stainless steel, zinc oxide, metal whisker, and so on.

To the polyamide resin composition of the present invention, additives such as a matting agent, a weather resistant stabilizer, an ultraviolet ray absorber, a nucleating agent, a plasticizer, a flame retarder, an antistatic agent, a color protection agent, a antigelling agent, a coloring agent, a release agent, and the like can be added within the range where the effects of the present invention are not impaired.

The polyamide resin composition of the present invention is required to have an oxygen permeability coefficient of not more than 1 cc·mm/m$^2$·day·atm at 23° C. and 75% RH. When the subject oxygen permeability coefficient is not more than 1, the barrier properties against various gases such as fleon, carbon dioxide, hydrogen, an alcohol, and the like are favorable. The oxygen permeability coefficient is preferably not more than 0.7 cc·mm/m$^2$·day·atm, and more preferably not more than 0.5 cc·mm/m$^2$·day·atm.

<Molded Product>

A molded product comprising the polyamide resin composition of the present invention has both gas barrier properties and heat aging resistance and can be utilized for various automobile parts, electric product parts, and the like, and hence, it is preferable. In particular, as the molded product comprising the polyamide resin composition, hoses or tubes can be preferably used.

EXAMPLES

The present invention is hereunder described in more detail by reference to the Examples and Comparative Examples, but it should not be construed that the present invention is limited thereto. Incidentally, in the present Examples, various measurements were carried out in the following methods.

(1) Gas Barrier Properties

An oxygen permeability coefficient (cc·mm/m$^2$·day·atm) of a film was measured in an atmosphere at 23° C. and 75% RH in conformity with JIS K7126. For the measurement, OX-TRAN 2/21, manufactured by Modern Controls Inc. was used. It is meant that the lower the value, the more favorable the gas barrier properties are.

(2) Heat Aging Resistance

First of all, a film was heat treated at 130° C. for hours by using a hot air dryer. Subsequently, a tensile characteristic of the film before and after the heat treatment was tested in conformity with JIS K7127, thereby determining a stress at break (MPa). Incidentally, the measurement was carried out by using Strograph, manufactured by Toyo Seiki Seisaku-sho, Ltd. as an apparatus under conditions of a specimen width of 10 mm, a chuck-to-chuck distance of 50 mm, a tensile rate of 50 mm/min, a measurement temperature of 23° C., and a measurement humidity of 50% RH. A ratio of the stress at break before and after the heat treatment was defined as a tensile strength retention rate, and the tensile strength retention rate (%) was calculated according to the following expression (1). It is meant that the higher this tensile strength retention rate, the more excellent the heat aging resistance is.

Tensile strength retention rate (%)=[{Stress at break (MPa) of film after heat treatment}/{Stress at break (MPa) of film before heat treatment}]×100    (1)

(3) Melting Point and Glass Transition Temperature of Polyamide

A melting point and a glass transition temperature were determined by means of differential scanning calorimetry (DSC) by using DSC-60, manufactured by Shimadzu Corporation. With respect to a measurement condition, about 5 mg of a sample was subjected to temperature elevation under a condition at 10° C./min, and when the temperature reached 300° C., the sample was quenched and again subjected to temperature elevation under a condition at 10° C./min.

(4) Number Average Molecular Weight

A number average molecular weight was determined in terms of a value as reduced into PMMA by means of GPC measurement using HLC-8320GPC, manufactured by Tosoh Corporation. Incidentally, TSKgel Super HM-H was used as a column for measurement; hexafluoroisopropanol (HFIP) having 10 mmoles/L of sodium trifluoroacetate dissolved therein was used as a solvent; and a measurement temperature was set to 40° C. Also, a calibration curve was prepared by dissolving PMMA at six levels in HFIP and measuring the solution.

Production Example 1

Synthesis of Polyamide (A1)

After sebacic acid (TA grade, manufactured by Ito Oil Chemicals Co., Ltd.) was heated and melted at 170° C. within a reactor, m-xylylenediamine (MXDA, manufactured by Mitsubishi Gas Chemical Company, Inc.) was gradually added dropwise in a molar ratio to sebacic acid of 1/1 while stirring the contents, and meanwhile, the temperature was elevated to 240° C. After completion of the dropwise addition, the temperature was elevated to 260° C. After completion of the reaction, the contents were taken out in a strand form and pelletized by a pelletizer. The obtained pellets were charged in a tumbler and subjected to solid phase polymerization under reduced pressure, thereby obtaining a polyamide (A1) having an adjusted molecular weight.

The polyamide (A1) had a melting point of 191° C., a glass transition temperature of 60° C., and a number average molecular weight of 30,000. An oxygen permeability coefficient thereof was 0.8 cc·mm/m$^2$·day·atm.

Production Example 2

Synthesis of Polyamide (A2)

After adipic acid (manufactured by Rhodia) was heated and dissolved in a nitrogen atmosphere within a reactor, a mixed diamine of p-xylylenediamine (PXDA, manufactured by Mitsubishi Gas Chemical Company, Inc.) and m-xylylenediamine in a molar ratio (PXDA/MXDA) of 3/7 was gradually added dropwise to give a molar ratio of the diamine to the dicarboxylic acid of 1/1 while stirring the contents, and meanwhile, the temperature was elevated. After completion of the dropwise addition, the stirring and reaction were continued until the viscosity reached a prescribed value. Thereafter, the contents were taken out in a strand form and pelletized by a pelletizer, thereby obtaining a polyamide (A2). The polyamide (A2) had a melting point of 258° C., a glass transition temperature of 90° C., and a number average molecular weight of 25,000. An oxygen permeability coefficient thereof was 0.15 cc·mm/m$^2$·day·atm.

Production Example 3

Synthesis of Polyamide (A3)

A polyamide (A3) was synthesized in the same manner as that in Production Example 2, except that sebacic acid was used in place of the adipic acid in the Production Example 2. The polyamide (A3) had a melting point of 215° C., a glass transition temperature of 63° C., a number average molecular weight of 19,000, and an oxygen permeability coefficient of 0.8 cc·mm/m$^2$·day·atm.

Production Example 4

Synthesis of Polyamide (A4)

A polyamide (A4) was synthesized in the same manner as that in Production Example 2, except that in the Production Example 2, a mixed diamine of p-xylylenediamine and m-xylylenediamine whose molar ratio (PXDA/MXDA) is 6/4 was used. The polyamide (A4) had a melting point of 288° C., a glass transition temperature of 95° C., a number average molecular weight of 21,000, and an oxygen permeability coefficient of 0.3 cc·mm/m$^2$·day·atm.

Production Example 5

Synthesis of Polyamide (A5)

After a mixed dicarboxylic acid of adipic acid and isophthalic acid (manufactured by A.G. International Chemical Co., Inc.) in a molar ratio of 9/1 was heated and dissolved in a nitrogen atmosphere within a reactor, m-xylylenediamine was gradually added dropwise to give a molar ratio of the diamine to the dicarboxylic acid of 1/1 while stirring the contents, and meanwhile, the temperature was elevated. After completion of the dropwise addition, the stirring and reaction were continued until the viscosity reached a prescribed value. Thereafter, the contents were taken out in a strand form and pelletized by a pelletizer. The obtained pellets were charged in a tumbler and subjected to solid phase polymerization under reduced pressure, thereby obtaining a polyamide (A5) having an adjusted molecular weight.

The polyamide (A5) had a melting point of 226° C., a glass transition temperature of 94° C., a number average molecular weight of 48,000, and an oxygen permeability coefficient of 0.13 cc·mm/m$^2$·day·atm.

Production Example 6

Synthesis of Polyamide (A6)

A polyamide (A6) was synthesized in the same manner as that in Production Example 3, except that in the Production Example 3, a mixed diamine of p-xylylenediamine and m-xylylenediamine whose molar ratio (PXDA/MXDA) is 4/6 was used. The polyamide (A6) had a melting point of 221° C., a glass transition temperature of 64° C., a number average molecular weight of 23,000, and an oxygen permeability coefficient of 0.9 cc·mm/m$^2$·day·atm.

Production Example 7

Synthesis of Polyamide (A7)

A polyamide (A7) was synthesized in the same manner as that in Production Example 3, except that in the Production Example 3, a mixed diamine of p-xylylenediamine and m-xylylenediamine whose molar ratio (PXDA/MXDA) is 2/8 was used. The polyamide (A7) had a melting point of 207° C., a glass transition temperature of 62° C., a number average molecular weight of 28,000, and an oxygen permeability coefficient of 0.8 cc·mm/m$^2$·day·atm.

Production Example 8

Synthesis of Polyamide (A8)

A polyamide (A8) was synthesized in the same manner as that in Production Example 3, except that in the Production Example 3, a mixed diamine of p-xylylenediamine and m-xylylenediamine whose molar ratio (PXDA/MXDA) is 5/5 was used. The polyamide (A8) had a melting point of 227° C., a glass transition temperature of 66° C., a number average molecular weight of 18,000, and an oxygen permeability coefficient of 1.0 cc·mm/m$^2$·day·atm.

Example 1

100 parts by mass of a polyamide obtained by polycondensation of adipic acid and m-xylylenediamine (N-MXD6, manufactured by Mitsubishi Gas Chemical Company, Inc., MX nylon, grade: S6007) and 0.2 parts by mass of N,N'-di-2-naphthyl-p-phenylenediamine (Nocrac White, manufactured by Ouchi Shinko Chemical Industrial Co., Ltd.) were dry blended and extrusion molded with a two-screw extruder equipped with a screw having a diameter of 30 mm and a T-die, thereby obtaining a 100 µm-thick film.

By using the foregoing film, the foregoing gas barrier properties and heat aging resistance were evaluated. The evaluation results are shown in Table 1.

Examples 2 to 14 and 16 to 18

Films were obtained in the same manner as that in Example 1, except that the polyamide resin composition in Example 1 was changed to each of those described in Table 1, and then evaluated in the same manner. The evaluation results are shown in Table 1.

Comparative Examples 1 to 6

Films were obtained in the same manner as that except that the polyamide and additive(s) charged in the twin-screw extruder and extrusion molded in Example 1 were changed to those described in Table 1, respectively, and then evaluated in the same manner. The evaluation results are shown in Table 1.

Example 15

The polyamide and additives used in Example 2 and nylon 6 (manufactured by Ube Industries, Ltd., grade: 1020B) were dry blended in a mass ratio ((polyamide and additives)/(nylon 6)) of 3/7 (the addition amount of nylon 6 was 233.8 parts by mass based on 100 parts by mass of the polyamide resin) and molded with a single-screw extruder equipped with a screw having a diameter of 25 mm and a die, thereby obtaining a 200 µm-thick tubular molded product. A specimen for tensile strength measurement was cut out from this molded product and heat treated at 130° C. for 72 hours. A tensile strength retention rate of the specimen after the heat treatment was 92%. Also, an oxygen permeability coefficient thereof was 0.45 cc·mm/m$^2$·day·atm.

Incidentally, each of the abbreviations described in Table 1 is as follows.
- A1: Polyamide (A1) obtained in Production Example 1
- A2: Polyamide (A2) obtained in Production Example 2
- A3: Polyamide (A3) obtained in Production Example 3
- A4: Polyamide (A4) obtained in Production Example 4
- A5: Polyamide (A5) obtained in Production Example 5
- A6: Polyamide (A6) obtained in Production Example 6
- A7: Polyamide (A7) obtained in Production Example 7
- A8: Polyamide (A8) obtained in Production Example 8
- N-MXD6 (S6007): Polyamide obtained by polycondensation of adipic acid and m-xylylenediamine (manufactured by Mitsubishi Gas Chemical Company, Inc., MX nylon, grade: S6007, melting point: 240° C., number average molecular weight: 45,000)

N-MXD6 (S6121): Polyamide obtained by polycondensation of adipic acid and m-xylylenediamine (manufactured by Mitsubishi Gas Chemical Company, Inc., MX nylon, grade: S6121, melting point: 240° C., number average molecular weight: 65,000)

B1: N,N'-Di-2-naphthyl-p-phenylenediamine (Nocrac White, manufactured by Ouchi Shinko Chemical Industrial Co., Ltd.)

B2: 4,4'-Bis(α,α-dimethylbenzyl)diphenylamine (Nocrac CD, manufactured by Ouchi Shinko Chemical Industrial Co., Ltd.)

C1: Pentaerythritol tetrakis(3-laurylthiopropionate) (Sumilizer TP-D, manufactured by Sumitomo Chemical Co., Ltd.)

C2: 2-Mercaptobenzimidazole (Sumilizer MB, manufactured by Sumitomo Chemical Co., Ltd.)

C3: Dimyristyl-3,3'-thiodipropionate (Sumilizer TPM, manufactured by Sumitomo Chemical Co., Ltd.)

D1: 3,9-Bis[2-[3-(3-tert-butyl-4-hydroxy-5-methylphenyl)propionyloxy]-1,1-dimethylethyl]-2,4,8,10-tetraoxaspiro[5.5]undecane (Sumilizer GA-80, manufactured by Sumitomo Chemical Co., Ltd.)

D2: Pentaerythritol tetrakis[3-(3,5-di-t-butyl-4-hydroxyphenyl)propionate] (Irganox 1010, manufactured by Ciba-Geigy AG)

Nylon 6: Manufactured by Ube Industries, Ltd., grade: 1020B

As shown in the foregoing Examples, the polyamide resin compositions including (A) a polyamide and (B) an aromatic secondary amine based compound had both very excellent barrier properties and heat aging resistance, whereas the polyamide resin compositions not satisfying the specified conditions, and the like were inferior in heat aging resistance.

TABLE 1

| | Polyamide | Diamine (The ratio is a molar ratio) | Dicarboxylic acid | Additives (The numeral in the parenthesis is addition parts by mass) | | | (B)/(C) ratio (mass ratio) | Oxygen permeability coefficient (at 75% RH) (cc·mm/m$^2$·day·atm) | Tensile strength retention rate (%) (at 130° C. for 72 hours) |
|---|---|---|---|---|---|---|---|---|---|
| | | | | Aromatic secondary amine compound (B) | Organic sulfur based compound (C) | Other compound | | | |
| Example 1 | N-MXD6 (S6007) | MXDA | Adipic acid | B1 (0.2) | — | — | — | 0.15 | 90 |
| Example 2 | N-MXD6 (S6007) | MXDA | Adipic acid | B1 (0.02) | C1 (0.2) | — | 0.10 | 0.15 | 110 |
| Example 3 | N-MXD6 (S6121) | MXDA | Adipic acid | B2 (0.5) | C3 (0.1) | — | 5.0 | 0.15 | 100 |
| Example 4 | A1 | MXDA | Sebacic acid | B1 (0.7) | C2 (0.05) | — | 14 | 0.8 | 95 |
| Example 5 | A2 | PXDA/MXDA 3/7 | Adipic acid | B1 (0.1) | C3 (1.0) | — | 0.1 | 0.15 | 93 |
| Example 6 | A3 | PXDA/MXDA 3/7 | Sebacic acid | B2 (2.0) | C1 (0.3) | — | 6.7 | 0.8 | 105 |
| Example 7 | A4 | PXDA/MXDA 6/4 | Adipic acid | B2 (1.0) | C1 (0.5) | — | 2.0 | 0.3 | 108 |
| Example 8 | A5 | MXDA | Adipic acid/ Isophthalic acid 9/1 | B1 (0.4) | C1 (2.0) | — | 0.20 | 0.13 | 111 |
| Example 9 | N-MXD6 (S6007) | MXDA | Adipic acid | B1 (0.5) | C1 (0.5) | — | 1.0 | 0.15 | 115 |
| Example 10 | N-MXD6 (S6007) | MXDA | Adipic acid | B1 (1.0) | C1 (1.0) | — | 1.0 | 0.15 | 120 |
| Example 11 | N-MXD6 (S6007) | MXDA | Adipic acid | B1 (0.05) | C1 (0.05) | — | 1.0 | 0.15 | 80 |
| Example 12 | N-MXD6 (S6007) | MXDA | Adipic acid | B1 (0.15) | C1 (0.15) | — | 1.0 | 0.15 | 89 |
| Example 13 | N-MXD6 (S6007) | MXDA | Adipic acid | B1 (0.9) | C1 (0.09) | — | 10 | 0.15 | 90 |
| Example 14 | N-MXD6 (S6007) | MXDA | Adipic acid | B1 (1.5) | C1 (0.5) | — | 3.0 | 0.15 | 95 |
| Example 15 | N-MXD6 (S6007) | MXDA | Adipic acid | B1 (0.02) | C1 (0.2) | Nylon 6 (233.8) | 0.10 | 0.45 | 92 |
| Example 16 | A6 | PXDA/MXDA 4/6 | Sebacic acid | B1 (0.5) | C1 (0.5) | — | 1.0 | 0.9 | 116 |
| Example 17 | A7 | PXDA/MXDA 2/8 | Sebacic acid | B1 (1.0) | C1 (1.0) | — | 1.0 | 0.8 | 119 |
| Example 18 | A8 | PXDA/MXDA 5/5 | Sebacic acid | B1 (0.2) | C1 (0.2) | — | 1.0 | 1.0 | 100 |
| Comparative Example 1 | N-MXD6 (S6007) | MXDA | Adipic acid | — | — | — | — | 0.15 | 50 |
| Comparative Example 2 | N-MXD6 (S6007) | MXDA | Adipic acid | — | — | D1 (0.5) | — | 0.15 | 40 |
| Comparative Example 3 | N-MXD6 (S6007) | MXDA | Adipic acid | — | — | D2 (0.5) | — | 0.15 | 45 |
| Comparative Example 4 | N-MXD6 (S6007) | MXDA | Adipic acid | — | C1 (0.5) | — | — | 0.15 | 55 |
| Comparative Example 5 | N-MXD6 (S6007) | MXDA | Adipic acid | — | C1 (0.5) | D1 (0.5) | — | 0.15 | 60 |
| Comparative Example 6 | A1 | MXDA | Sebacic acid | — | — | — | — | 0.8 | 50 |

The invention claimed is:

1. A polyamide resin composition, comprising
(A) a polyamide comprising a diamine unit, comprising 30% by mole or more of an m-xylylenediamine unit, and a dicarboxylic acid unit,
(B) an aromatic, secondary-amine-based compound, and
(C) an organic, sulfur-based compound
wherein a content ratio of the aromatic, secondary-amine-based compound (B) and the organic, sulfur-based compound (C) ((B)/(C) mass ratio) in the polyamide resin composition is from 0.1 to 5.0,
wherein the organic sulfur based compound (C) is present in an amount of from 0.2 to 5 parts by mass based on 100 parts by mass of the polyamide (A), and
wherein a 100 μm-thick film consisting of the polyamide resin composition has an oxygen permeability coefficient of not more than 1 cc·mm/$^2$day·atm at 23 ° C. and 75 % RH, and has a tensile strength retention rate (%) of not less than 92% as calculated according to the following expression (1):
Tensile strength retention rate (%) =[{Stress at break (MPa) of film after heat treatment}/{Stress at break (MPa) of film before heat treatment}]×100 (1)
where the stress at break (MPa) in this expression is tested in conformity with JIS K7127 by using the film before and after heat treatment at 130° C. for 72 hours.

2. The polyamide resin composition of claim 1, wherein the organic sulfur based compound (C) is present in an amount of from 0.2 to 1 parts by mass based on 100 parts by mass of the polyamide (A) and the content ratio of the aromatic, secondary-amine-based compound (B) and the organic, sulfur-based compound (C) ((B)/(C) mass ratio) in the polyamide resin composition is from 0.2 to 2.0.

3. The polyamide resin composition of claim 1, wherein the diamine unit comprises 50% by mole or more of the m-xylylenediamine unit.

4. The polyamide resin composition of claim 1, wherein the diamine unit comprises 70% by mole or more of the m-xylylenediamine unit.

5. The polyamide resin composition of claim 1, wherein the diamine unit comprises the m-xylylenediamine unit and a p-xylylenediamine unit.

6. The polyamide resin composition of claim 1, wherein
the diamine unit comprises the m-xylylenediamine unit and a p-xylylenediamine unit, and
a proportion of the m-xylylenediamine unit in the diamine unit is 30% by mole or more.

7. The polyamide resin composition of claim 1, wherein the dicarboxylic acid unit comprises 50% by mole or more of an α,ω-linear aliphatic dicarboxylic acid unit having from 4 to 20 carbon atoms.

8. The polyamide resin composition of claim 1, wherein the dicarboxylic acid unit comprises an α,ω-linear aliphatic dicarboxylic acid unit having from 4 to 20 carbon atoms and an isophthalic acid unit.

9. The polyamide resin composition of claim 1, wherein
the dicarboxylic acid unit comprises an α,ω-linear aliphatic dicarboxylic acid unit having from 4 to 20 carbon atoms and an isophthalic acid unit, and
a proportion of the α,ω-linear aliphatic dicarboxylic acid unit in the dicarboxylic acid unit is 50% by mole or more.

10. The polyamide resin composition of claim 1, wherein
the dicarboxylic acid unit comprises an α,ω-linear aliphatic dicarboxylic acid unit having from 4 to 20 carbon atoms and an isophthalic acid unit, and
a proportion of the α,ω-linear aliphatic dicarboxylic acid unit in the dicarboxylic acid unit is 70% by mole or more.

11. The polyamide resin composition of claim 7, wherein the linear aliphatic dicarboxylic acid unit is an adipic acid unit.

12. The polyamide resin composition of claim 7, wherein the linear aliphatic dicarboxylic acid unit is a sebacic acid unit.

13. The polyamide resin composition of claim 1, wherein the aromatic, secondary-amine-based compound (B) is at least one selected from the group consisting of a compound having a diphenylamine skeleton, a compound having a phenylnaphthylamine skeleton, and a compound having a dinaphthylamine skeleton.

14. The polyamide resin composition of claim 1, wherein the aromatic, secondary-amine-based compound (B) is at least one selected from the group consisting of a compound having a diphenylamine skeleton and a compound having a phenylnaphthylamine skeleton.

15. The polyamide resin composition of claim 1, wherein the aromatic, secondary-amine-based compound (B) is at least one selected from the group consisting of N-phenyl-1-naphthylamine, a p,p'-dialkyldiphenylamine having a carbon number of the alkyl group of 8 to 14, octylated diphenylamine, 4,4'-bis(α,α-dimethylbenzyl)diphenylamine, p-(p-toluenesulfonylamido)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, 2,2'-dinaphthylamine, 1,2'-dinaphthylamine, and 1,1'-dinaphthylamine.

16. The polyamide resin composition of claim 1, wherein the aromatic, secondary-amine-based compound (B) is at least one selected from the group consisting of N,N'-di-2-naphthyl-p-phenylenediamine and 4,4'-bis(α,α-dimethylbenzyl)diphenylamine.

17. The polyamide resin composition of claim 1, wherein the organic, sulfur-based compound (C) is at least one selected from the group consisting of a mercaptobenzoimidazole-based compound, a dithiocarbamic acid-based compound, a thiourea-based compound, and an organic, thio-acid-based compound.

18. The polyamide resin composition of claim 1, wherein the organic, sulfur-based compound (C) is at least one selected from the group consisting of a mercaptobenzoimidazole-based compound and an organic, thio-acid-based compound.

19. The polyamide resin composition of claim 1, wherein the organic, sulfur-based compound (C) is at least one selected from the group consisting of 2-mercaptobenzoimidazole, 2-mercaptomethylbenzimidazole, dimyristyl-3,3'-thiodipropionate, distearyl-3,3'-thiodipropionate, and pentaerythritol tetrakis(3-laurylthiopropionate).

20. The polyamide resin composition of claim , wherein the organic, sulfur-based compound (C) is at least one selected from the group consisting of pentaerythritol tetrakis(3-laurylthiopropionate), dimyristyl-3,3'-thiodipropionate, and 2-mercaptobenzimidazole.

21. A molded product, comprising the polyamide resin composition of claim 1.

22. The molded product of claim 21, which is a hose or a tube.

* * * * *